(12) United States Patent
Levesque et al.

(10) Patent No.: US 7,573,808 B2
(45) Date of Patent: Aug. 11, 2009

(54) SMART RESYNC OF DATA BETWEEN A NETWORK MANAGEMENT SYSTEM AND A NETWORK ELEMENT

(75) Inventors: Gilbert Levesque, Mountain View, CA (US); Drago Goricanec, San Jose, CA (US); Anurag Sharma, San Jose, CA (US); Ajay Singhani, Fremont, CA (US); Vijay Damojipurapu, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 963 days.

(21) Appl. No.: 10/912,152

(22) Filed: Aug. 6, 2004

(65) Prior Publication Data

US 2006/0028979 A1 Feb. 9, 2006

(51) Int. Cl.
 *H04L 12/26* (2006.01)
(52) U.S. Cl. ...................................... 370/216
(58) Field of Classification Search ......... 370/216–220, 370/229–235, 238, 259, 270; 709/220–226, 709/248, 244
See application file for complete search history.

(56) References Cited

U.S. PATENT DOCUMENTS

| | | | | |
|---|---|---|---|---|
| 4,481,583 A | * | 11/1984 | Mueller | 710/244 |
| 5,247,677 A | * | 9/1993 | Welland et al. | 718/103 |
| 5,522,045 A | * | 5/1996 | Sandberg | 709/215 |
| 5,528,513 A | * | 6/1996 | Vaitzblit et al. | 718/103 |
| 5,841,759 A | * | 11/1998 | Russ et al. | 370/221 |
| 6,687,257 B1 | * | 2/2004 | Balasubramanian | 370/429 |
| 7,093,250 B1 | * | 8/2006 | Rector | 718/100 |
| 7,178,146 B1 | * | 2/2007 | McClure et al. | 718/102 |
| 7,321,568 B2 | * | 1/2008 | Kosanovic et al. | 370/286 |
| 2003/0037091 A1 | * | 2/2003 | Nishimura et al. | 709/103 |
| 2004/0213259 A1 | * | 10/2004 | Porter | 370/395.2 |
| 2005/0243848 A1 | * | 11/2005 | Yuan et al. | 370/412 |

* cited by examiner

*Primary Examiner*—Dmitry Levitan
(74) *Attorney, Agent, or Firm*—Hanify & King, PC (57) ABSTRACT

Network recovery of multiple NEs, such as at NMS restart, or at re-establishment of communication after loss of communication with the NMS that provides reduced cost and reduced the elapsed time before the NMS can start performing network monitoring. A method of recovering data from a network element at a network management system comprises the steps of determining whether a data buffer of the network element is valid, if the data buffer of the network element is valid, determining whether the data buffer of the network element contains a database change event not received by the network management system, if the data buffer of the network element is not valid or if the data buffer of the network element contains a database change event not received by the network management system, indicating that the data buffer of the network element is out-of-sync with the network management system, and if the data buffer of the network element is valid and if the data buffer of the network element does not contains a database change event not received by the network management system, indicating that the data buffer of the network element is in sync with the network management system.

48 Claims, 9 Drawing Sheets

Fig. 9

SMART RESYNC OF DATA BETWEEN A NETWORK MANAGEMENT SYSTEM AND A NETWORK ELEMENT

BACKGROUND OF THE INVENTION

1. Field of the Invention

The present invention relates to a method and system for recovering data from a network element at a network management system (NMS), such as at NMS restart, or at re-establishment of communication after loss of communication with the NMS.

2. Description of the Related Art

As telecommunications services have proliferated, telecommunications networks have become increasingly complex. Today, telecommunications networks, using technologies such as Synchronous Optical Network (SONET), Dense Wavelength Division Multiplexing (DWDM), Asynchronous Transfer Mode (ATM), Ethernet, etc., may extend worldwide and may include thousands of network elements (NEs). Typically, such networks include network management servers (NMSs) that provide the capability to manage, provision and maintain the thousands of network elements. Often, there is only a single server in such a network. Problems arise when this server experiences a failure, either due to hardware or software failure on the server, or due to loss of communications by the server. In order to recover from such a failure, the NMS must re-establish its management control over all of the thousands of NEs in the network.

Typically, NE recovery includes three basic operations:

NE Login: The NMS must establish connectivity with the NE and login to open a session on the NE.

Alarm/Fault Recovery: The NMS must fetch active NE faults and reconcile the NE faults in NMS database.

NE Data Recovery: The NMS must fetch NE configuration data and update the NMS database.

These three basic operations, however, have significantly different costs in terms of time, NMS computing load, and network traffic load. For example, the cost of various recovery operations:

NE Login: A lightweight operation. Cost is very small.

Alarm/Fault Recovery: Fairly lightweight operation. NE usually has few active faults. Cost is fairly small.

NE Data Recovery: Heavyweight operation. Cost is very high (depends on the size of the NE configuration data).

NE recovery must be executed in the case of NMS restart after hardware or software failure of the NMS, upon re-establishment of communication with the NE after loss of communication with the NE, and upon re-login into the NE after NE logout. NE data recovery is a very costly operation. Although NE Login and Alarm/Fault Recovery are relatively lightweight operations, involving relatively short times to perform and consuming relatively few network resources, NE Data Recovery is a heavyweight operation. In order to perform NE data recovery, the NMS must fetch NE configuration data, process it and persist it in the NMS DB. As each NE may have a relatively large amount of data to be recovered, the cost to perform NE data recovery on even one NE can be high. As the NMS needs to recover the NEs as a result of a number of situations, such as NMS Restart after hardware or software failure, NE Communication Re-establishment after loss of communications, and Re-login into the NE after NE logout, the need to perform recovery of the network may arise more frequently than desired. In cases where recovery of multiple or all NEs in the network must be performed, such as at NMS restart or communication re-establishment, the cost to perform NE recovery increases. As networks may include thousands of network elements, it is seen that the cost of network recovery may be very high.

In addition, since the basic (and the most important) NE operations cannot be executed until network recovery has completed, customer availability is significantly reduced.

Figure 1:
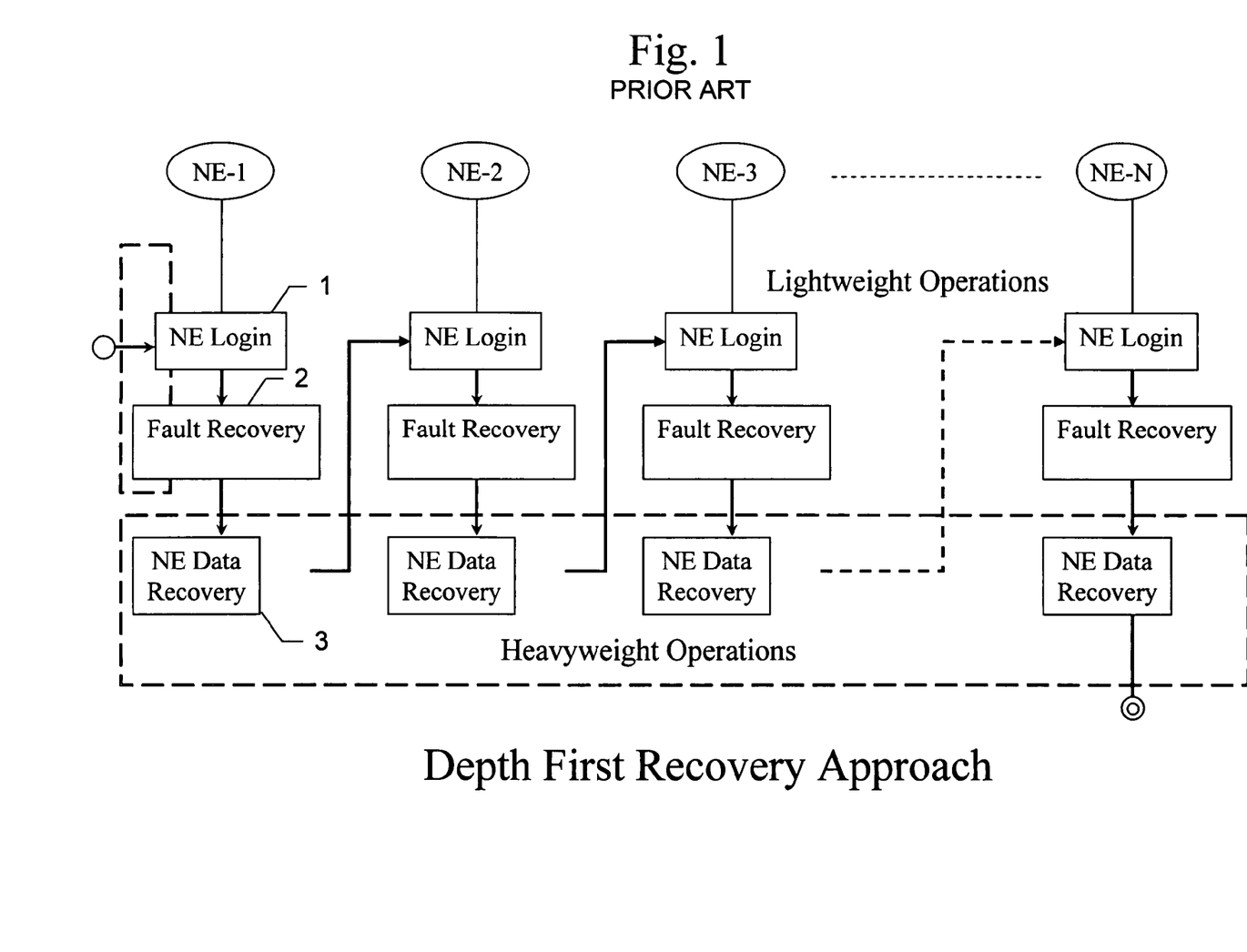
FIG. 1 is a flow diagram of a typical prior art network recovery process.

A typical prior art network recovery process is shown in FIG. 1. Such a prior art recovery solutions implements a depth first recovery approach. With such an approach, the elapsed time before the NMS can start performing network monitoring can be very long. All steps of the recovery for an NE must be completed before the recovery of the next NE can start. In particular, NE Login 1, Fault Recover 2, and NE Data Recovery 3 must be completed for NE-1 before any recovery steps can be performed on NE-2. Problems arise with this approach in that network fault monitoring can start only after all the NEs in the network have been recovered. In addition, in some network management systems, if the NE has not been recovered or if NE recovery is in progress, no operations are allowed on the NE.

A need arises for a technique by which the costs of network recovery of multiple NEs, such as at NMS restart, or at re-establishment of communication after loss of communication with the NMS, can be reduced. In addition, a need arises for a technique by which the elapsed time before the NMS can start performing network monitoring can be reduced.

SUMMARY OF THE INVENTION

The present invention reduces the costs of network recovery of multiple NEs, such as at NMS restart, or at re-establishment of communication after loss of communication with the NMS. In addition, the present invention reduces the elapsed time before the NMS can start performing network monitoring.

In one embodiment of the present invention, a method of recovering data from a network element at a network management system comprises the steps of determining whether a data buffer of the network element is valid, if the data buffer of the network element is valid, determining whether the data buffer of the network element contains a database change event not received by the network management system, if the data buffer of the network element is not valid or if the data buffer of the network element contains a database change event not received by the network management system, indicating that the data buffer of the network element is out-of-sync with the network management system, and if the data buffer of the network element is valid and if the data buffer of the network element does not contains a database change event not received by the network management system, indicating that the data buffer of the network element is in sync with the network management system.

In one aspect of the present invention, the step of determining whether a data buffer of the network element is valid comprises the steps of determining whether a last event of the network element received by the network management system from the network element is present in the data buffer of the network element and if the last event received by the network management system from the network element is present in the data buffer of the network element, determining that the data buffer of the network element is valid.

In one embodiment of the present invention, a method of recovering operations of a network comprising a plurality of network elements comprises the steps of logging in to each of the plurality of network elements, after logging in to each of the plurality of network elements, recovering active faults from each of the plurality of network elements, and after recovering active faults from each of the plurality of network elements, recovering data from each of the plurality of network elements.

In one aspect of the present invention, the method further comprises the step of after logging in to a network element, but before logging in to all of the plurality of network elements, performing on the network element operations that only require connectivity to the network element. The method further comprises the step of after recovering active faults from the network element, but before recovering active faults from all of the plurality of network elements, monitoring the network element for additional faults and alarms. The method further comprises the step of after recovering data from the network element, but before recovering data from all of the plurality of network elements, resuming network operations with the network element.

In one aspect of the present invention, the step of recovering data from each of the plurality of network elements comprises, for each network element, the steps of determining whether a data buffer of the network element is valid, if the data buffer of the network element is valid, determining whether the data buffer of the network element contains a database change event not received by the network management system, if the data buffer of the network element is not valid or if the data buffer of the network element contains a database change event not received by the network management system, indicating that the network element is out-of-sync with the network management system, and if the data buffer of the network element is valid and if the data buffer of the network element does not contains a database change event not received by the network management system, indicating that the network element is in sync with the network management system. The step of determining whether a data buffer of the network element is valid comprises the steps of determining whether a last event of the network element received by the network management system from the network element is present in the data buffer of the network element and if the last event received by the network management system from the network element is present in the data buffer of the network element, determining that the data buffer of the network element is valid.

In one embodiment of the present invention, a method of controlling operations of a network management system on a network comprising a plurality of network elements comprises the steps of assigning a weight and a priority to each of a plurality of operations to be performed on the network management system and executing at least one of the plurality of operations based on the weight and priority of the at least one operation, based on the weights and priorities of other operations to be performed, and based on utilization of resources of the network management system by operations that are being executed.

In one aspect of the present invention, the executing step comprises the step of executing the at least one of the plurality of operations using priority based scheduling with task weighting. The executing step comprises the steps of scheduling for execution an oldest, highest priority operation for execution from among the plurality of operations to be executed and executing the scheduled operation, if sufficient resources of the network management system are available to execute the scheduled operation. The method further comprises the step of determining whether sufficient resources of the network management system are available to execute the scheduled operation based on a weight of the scheduled operations and on weights of the operations that are being executed.

In one aspect of the present invention, the step of recovering data from each of the plurality of network elements comprises, for each network element, the steps of determining whether a data buffer of the network element is valid, if the data buffer of the network element is valid, determining whether the data buffer of the network element contains a database change event not received by the network management system, if the data buffer of the network element is not valid or if the data buffer of the network element contains a database change event not received by the network management system, indicating that the data buffer of the network element is out-of-sync with the network management system, and if the data buffer of the network element is valid and if the data buffer of the network element does not contains a database change event not received by the network management system, indicating that the data buffer of the network element is in sync with the network management system. The step of determining whether a data buffer of the network element is valid comprises the steps of determining whether a last event of the network element received by the network management system from the network element is present in the data buffer of the network element and if the last event received by the network management system from the network element is present in the data buffer of the network element, determining that the data buffer of the network element is valid.

BRIEF DESCRIPTION OF THE DRAWINGS

The preferred embodiments of the present invention will be described with reference to the accompanying drawings.

DETAILED DESCRIPTION OF THE PREFERRED EMBODIMENTS

The present invention reduces the costs of network recovery of multiple NEs, such as at NMS restart, or at re-establishment of communication after loss of communication with the NMS. In addition, the present invention reduces the elapsed time before the NMS can start performing network monitoring.

Figure 2:
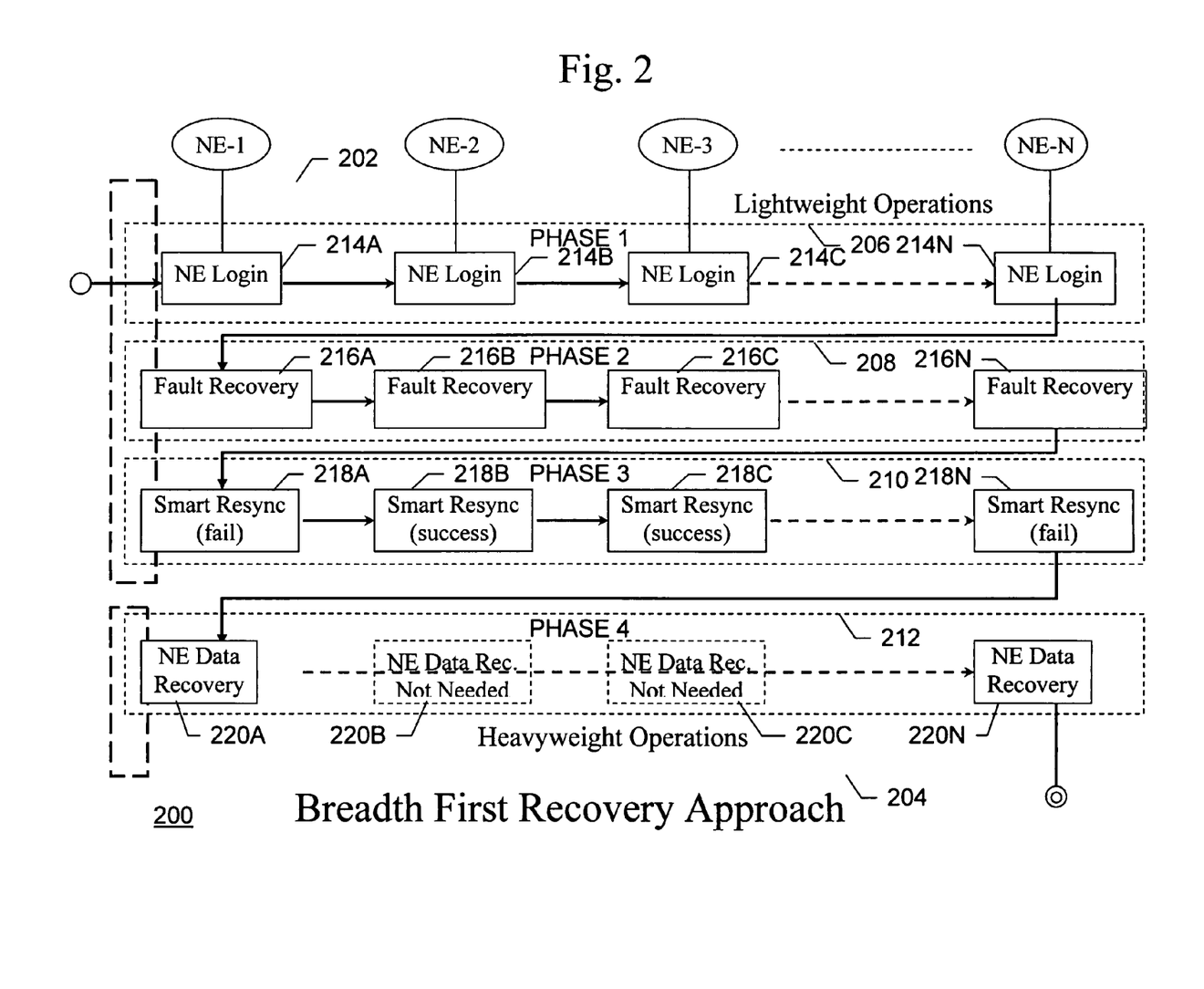
FIG. 2 is an exemplary flow diagram of a network recovery process according to the present invention.

The present invention implements a phased recovery process 200 for network recovery of multiple NEs, such as at NMS restart, or at re-establishment of communication after loss of communication with the NMS, as shown in FIG. 2. In phased recovery process 200, the lightweight operations 202 are completed first for all the NEs before starting the heavyweight operations 204.

Phased recovery process 200 implements a breadth first recovery approach:
- Phase 1 206: Login into all the NEs,
- Phase 2 208: Recover active faults of all the NEs,
- Phase 3 210: Use smart resync to check if NE data needs to be recovered,
- Phase 4 212: Recover NE data of all the NEs that need to be recovered.

These phases will be described in greater detail below, using, as an example, the NETSMART 1500® by FUJITSU NETWORK COMMUNICATIONS®. This system is used only as an example, and one of skill in the art would recognize that the present invention is equally applicable to any network management system. Thus, the present invention contemplates application to any network management system.

In phase 1 206, the NMS performs a login operation on each NE in the network. For example, the NMS performs NE logins 214A-N in phase 1 206 before proceeding to perform any fault recovery in phase 2 208. NETSMART attempts to recover all NEs in the InService state and their recovery will be dictated by recovery level defined by the user as part of the NE profile. There is no action taken for NEs in other states during a normal server restart. Before the login the NE state will change to NotAvailable/LoginPending. In phase 1 206, for all NEs having the persistent state InService, NETSMART will change their in-memory state to NotAvailable/AlarmsPending (leaving the persistent state as InService). After changing the state, NETSMART will initiate alarm resync for such NEs in batches during phase 2 208. This will result in login followed by alarm resync in phase 2 208 for the NEs for which alarm resync gets initiated.

The NMS is communicatively connected to all the NEs in the network at the end of phase 1. The NMS operator will be able to perform basic NE operations that only need connectivity to the NE. For example, since the NMS has early connectivity to all the NEs in the network, the NMS will start receiving autonomous messages for alarms, events, etc.

In phase 2 208, the NMS recovers active faults from all the NEs. For example, fault recovery operations 216A-N are performed on the NEs. All NEs for which alarm resync has not been initiated yet will appear in NotAvailable/AlarmsPending state. NEs will move to NotAvailable/ConfigPending state after completion of alarm resync. At end of phase 2, all NEs will move to NotAvailable/ConfigPending state. NEs with recovery level set to 'ALARM' will move to InService state after the alarm resync gets completed for them during phase 2. For NEs with Recovery level set to 'NONE' no alarm resync will be performed and state will change to InService directly after NETSMART logs into the NE.

The NMS completes alarm/fault recovery of all the NEs in the network at the end of phase 2. At this point, the NMS management of the network with regard to alarms and faults has been restored, as the NMS operator will be able to monitor network alarms/faults. NMS customers require network alarms/faults monitoring with minimum interruption. Phased recovery enables customers to monitor network alarms/faults even before full recovery is complete. Thus, the downtime of fault monitoring has been significantly reduced over the prior art. NMS customers require NEs to be available faster during NMS recovery. Phased recovery provides early connectivity to all the NEs in the network. The operator can execute operations that only need connectivity to the NE.

In phase 3 210 smart resync is used to check if NE data needs to be recovered from all of the NEs. The NMS needs to fetch NE configuration data during because the NMS "does not know" if the NE configuration changed while the NMS was down or out of communication with the NE. For example, smart resync operations 218A-N are performed on the NEs. In this example, smart resync operations 218B and 218C are successes, that is, the NE and the NMS are found to already be in sync. Smart resync operations 218A and 218N are failures, that is, the NE and the NMS are found to be out-of-sync.

In the present invention, the NMS uses a technique termed "Smart Resync" to determine if NE configuration has changed and if full NE resync is needed. In Smart Resync, a full NE data recovery is performed only if the Smart Resync process determines that the NE configuration has changed and that a full NE data recovery is necessary. The Smart Resync process is described below.

In phase 4 212 NE data is recovered from all of the NEs that need to be recovered, as determined by the smart resync in phase 3 210. For example, data recovery operations 220A and 220N are performed because the corresponding smart resync operations 218A and 218N were failures, while data recovery operations 220B and 220C are not performed, because the corresponding smart resync operations 218B and 218C were successes. In phase 4, NETSMART will perform config resync of NE data for all NEs in Recovery/AlarmsResyncComplete state with recovery level set to 'ALL'. After phase 4 completes the NEs will move to InService.

Figure 3:
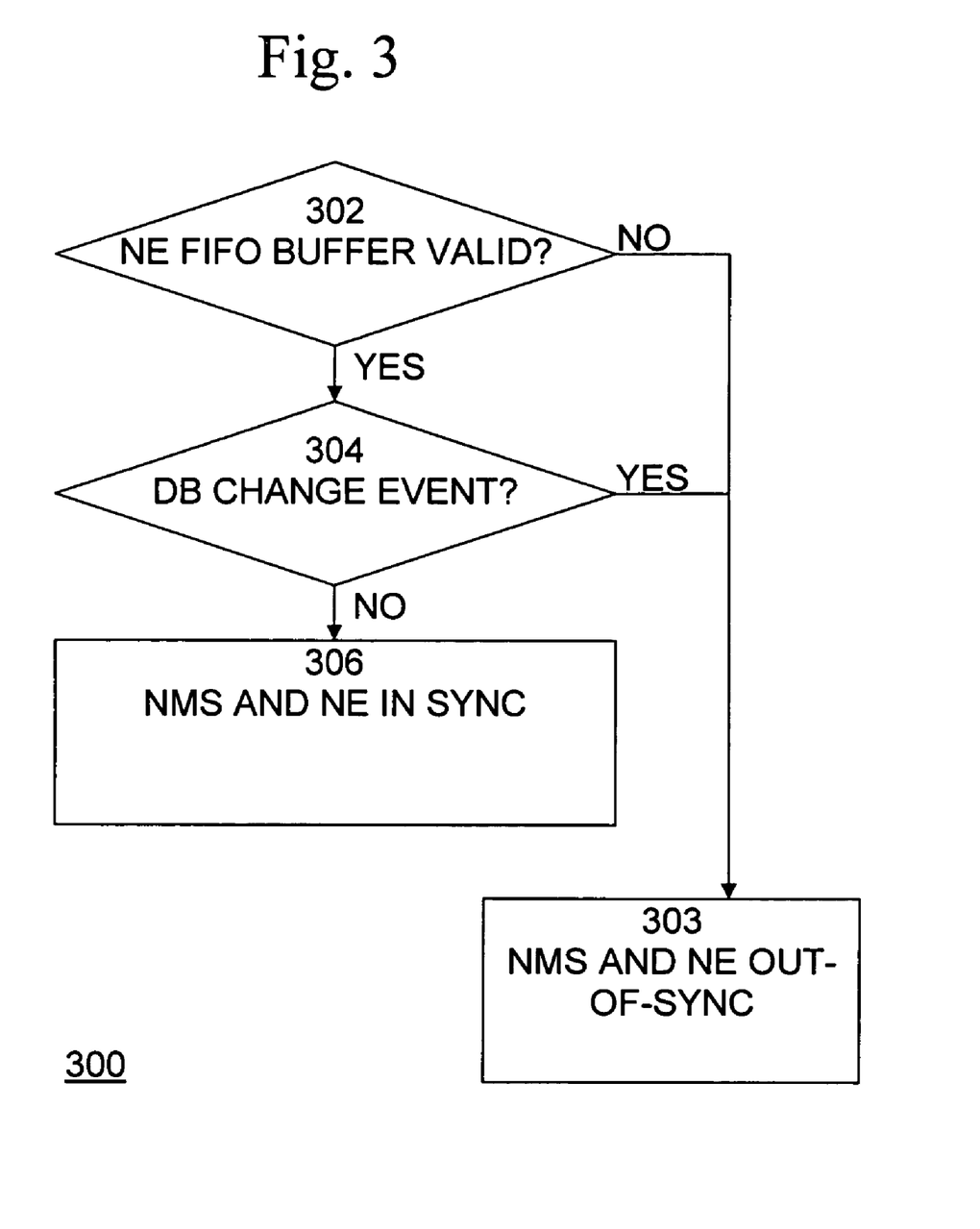
FIG. 3 is an exemplary flow diagram of Smart Resync process shown in FIG. 2.

An exemplary flow diagram of a Smart Resync process 300 is shown in FIG. 3. Process 300 begins with step 302, in which it is determined whether the NE first-in-first-out buffer is valid. Each NE has a FIFO buffer that stores events processed by the NE. In normal operation, events processed by the NE are both transmitted to the NMS and stored in the FIFO buffer. Events processed by the NE while the NMS is non-operational or out of communications are not received by the NMS, but they continue to be stored in the FIFO buffer of the NE. Upon NMS recovery, the nature of the events stored in the NE FIFO buffer can be determined.

However, the FIFO buffer has a limited size, so it only has room to store a limited number of events processed by the NE. Due to the first-in-first-out behavior of the buffer, the most recent events, up to the limit of the storage, are stored in the FIFO buffer and the older events are flushed from the buffer. If more events have occurred on the NE than can be stored in the buffer, some events that were not also received by the NMS have been flushed from the buffer. As a result, these events are lost, as the nature these events cannot be determined. If the last event received by the NMS is not present in the NE FIFO buffer, then at least one event has been lost and the NE FIFO buffer is not valid. In this case, process 300 continues with step 303, in which it is indicated that the NMS and the NE are out-of-sync (OOS) with each other.

If the last event received by the NMS is present in the NE FIFO buffer, then there are no events that have been lost and the NE FIFO buffer is valid. In this case, process 300 continues with step 304, in which it is determined whether there was any database change event after the last event that the NMS received. Since the NE FIFO buffer is valid, no events have been lost and the nature of all events that have occurred at the NE while the NMS was not receiving events can be determined. If there was a database change event that occurred after the last event received by the NMS, then the database in the NMS was never updated to reflect that database change. Therefore, the NMS is out-of-sync with the NE, and process 300 continues with step 303, in which it is indicated that the NMS and the NE are out-of-sync (OOS) with each other. If there was not a database change event that occurred after the last event received by the NMS, then the database in the NMS is up-to-date with the NE. Therefore, the NMS is in sync with the NE, and process 300 continues with step 306, in which it is indicated that the NMS and the NE are in sync with each other.

Figure 4A:
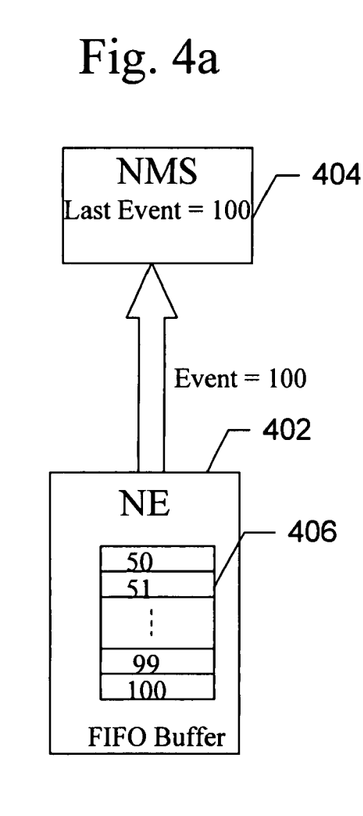
FIGS. 4a-d are exemplary block diagrams of examples of the operation of NEs during the Smart Resync process shown in FIG. 3.
Figure 4B:
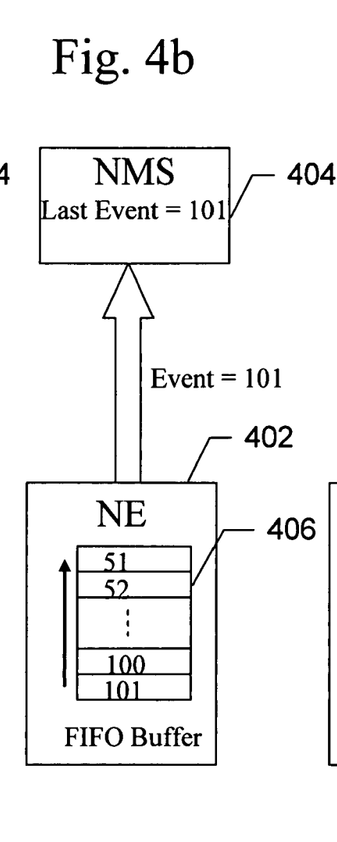
Figures 4C, 4D:
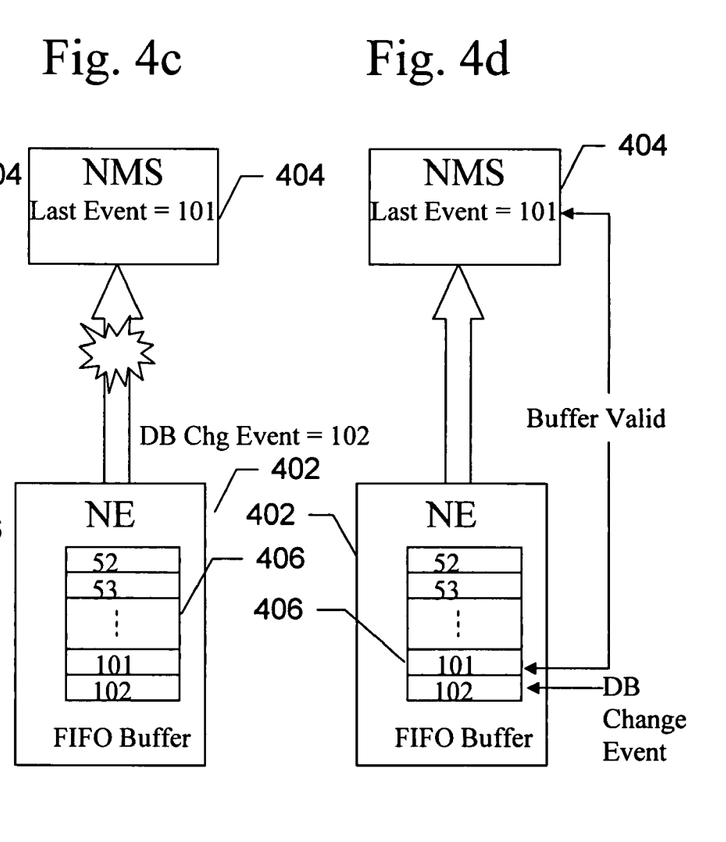
Figure 5A:
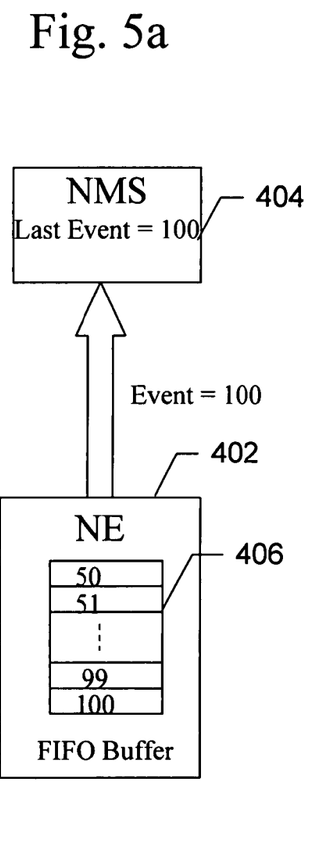
FIGS. 5a-d are exemplary block diagrams of examples of the operation of NEs during the Smart Resync process shown in FIG. 3.
Figure 5B:
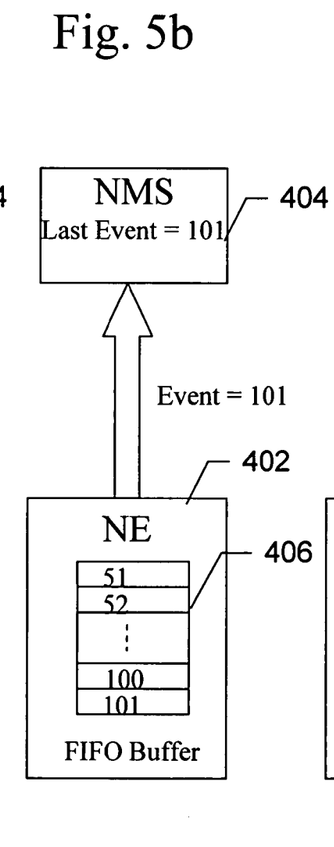
Figures 5C, 5D:
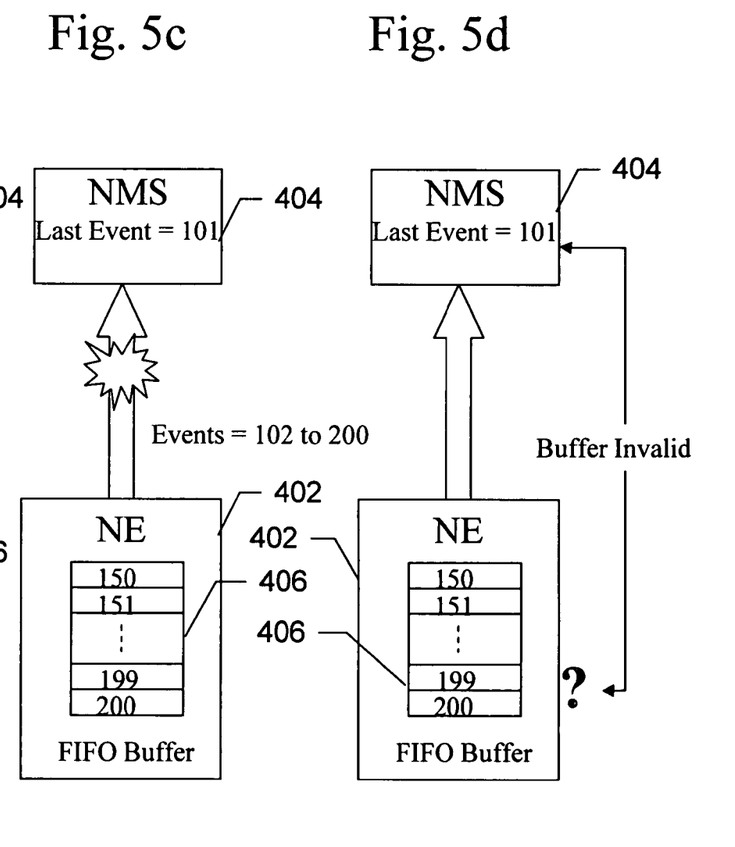
Figure 6A:
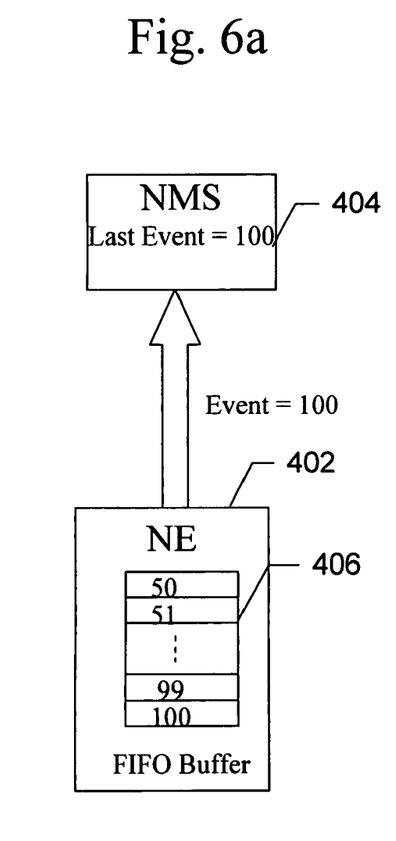
FIGS. 6a-d are exemplary block diagrams of examples of the operation of NEs during the Smart Resync process shown in FIG. 3.
Figure 6B:
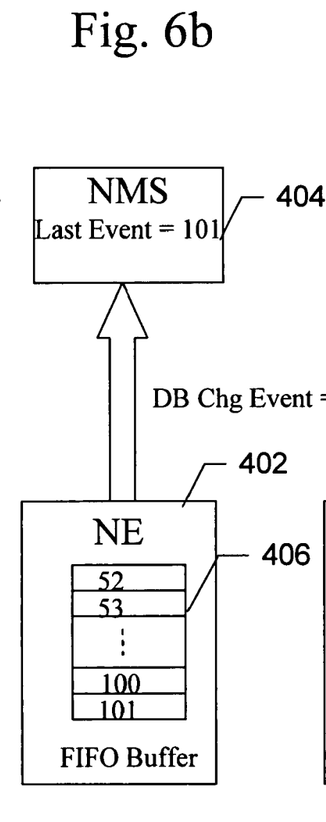
Figures 6C, 6D:
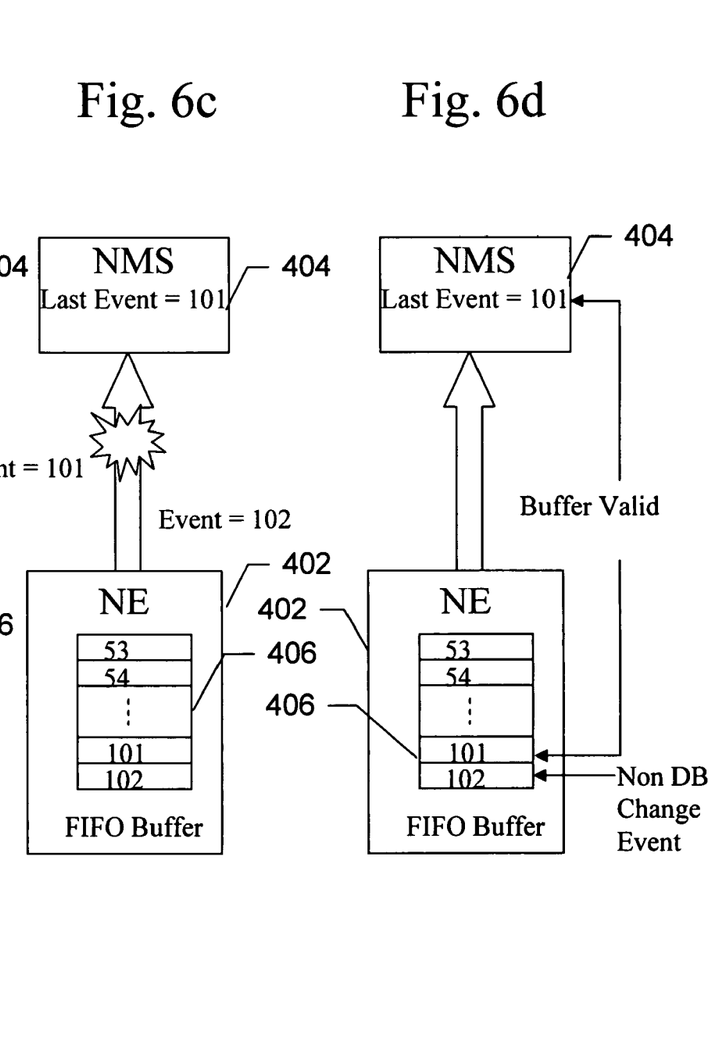

FIGS. 4-6, which are block diagrams of examples of the operation of NEs during Smart Resync process 300. FIGS. 4a-d illustrate an example in which the NMS is out-of-sync with the NE after communication loss because the NMS missed an NE database change event. In FIG. 4a, NE 402 transmits event 100 to NMS 404. Event 100 is persisted in the database of NMS 404 and is also stored in NE FIFO buffer 406. In FIG. 4b, NE 402 transmits event 101 to NMS 404. Event 101 is persisted in the database of NMS 404 and is also stored in NE FIFO buffer 406. FIFO buffer 406 discards the oldest event 50. In FIG. 4c, there is a communication loss with NMS 404. NE 402 transmits event 102, which is a database change event. Due to the communication loss, event 102 is not received by NMS 404 and so is not persisted in the database of NMS 404. In FIG. 4d, communication with NMS 404 is restored. NMS 404 uses process 300 to determine, in step 302, that the last event received by NMS 404, event 101, is present in FIFO buffer 406. Thus, FIFO buffer 406 is valid. In step 304, NMS 404 determines that a database change event, event 102, occurred after the last event received by NMS 404. In step 303, it is indicated that NMS 404 and NE 402 are out-of-sync. Therefore, NMS 404 must perform a full data recovery of NE 402.

FIGS. 5a-d illustrate an example in which the NMS is out-of-sync with the NE after communication loss because the NE FIFO buffer is invalid. In FIG. 5a, NE 402 transmits event 100 to NMS 404. Event 100 is persisted in the database of NMS 404 and is also stored in NE FIFO buffer 406. In FIG. 5b, NE 402 transmits event 101 to NMS 404. Event 101 is persisted in the database of NMS 404 and is also stored in NE FIFO buffer 406. FIFO buffer 406 discards the oldest event 50. In FIG. 5c, there is a communication loss with NMS 404. NE 402 transmits events 102 to 200. Due to the communication loss, events 102 to 200 are not received by NMS 404. Also, the last event received by NMS 404, event 101, along with some other events, is discarded from FIFO buffer 406. In FIG. 5d, communication with NMS 404 is restored. NMS 404 uses process 300 to determine, in step 302, that the last event received by NMS 404, event 101, is not present in FIFO buffer 406. Thus, FIFO buffer 406 is invalid. In step 303, it is indicated that NMS 404 and NE 402 are out-of-sync. Therefore, NMS 404 must perform a full data recovery of NE 402.

FIGS. 6a-d illustrate an example in which the NMS is in sync with the NE after communication loss because the NMS did not miss any NE database change events. In FIG. 6a, NE 402 transmits event 100 to NMS 404. Event 100 is persisted in the database of NMS 404 and is also stored in NE FIFO buffer 406. In FIG. 6b, NE 402 transmits event 101 to NMS 404. Event 101 is persisted in the database of NMS 404 and is also stored in NE FIFO buffer 406. FIFO buffer 406 discards the oldest event 50. In FIG. 6c, there is a communication loss with NMS 404. NE 402 transmits event 102, which is not a database change event. Due to the communication loss, event 102 is not received by NMS 404. In FIG. 6d, communication with NMS 404 is restored. NMS 404 uses process 300 to determine, in step 302, that the last event received by NMS 404, event 101, is present in FIFO buffer 406. Thus, FIFO buffer 406 is valid. In step 304, NMS 404 determines that no database change events occurred after the last event received by NMS 404. In step 306, it is indicated that NMS 404 and NE 402 are in sync. Therefore, NMS 404 need not any further data recovery of NE 402.

A typical NMS executes a variety of operations such as:
NE Recovery, which in turn is made up of basic operations such as:
NE Login,
Alarm/Fault Recovery, and
NE Data Recovery
NE Discovery, a first time NE login, which is initiated either automatically or by an NMS user.
Manual Resync, an NE Resync initiated by an NMS user.
Audit/Reconcile, an Audit/Reconcile of an NE configuration initiated by an NMS user.
Scheduled Manual Resync, an NE Resync automatically scheduled by the NMS.
Scheduled Audit/Reconcile, an Audit/Reconcile of an NE configuration automatically scheduled by the NMS.

Different NMS operation requires different amounts of system resources. Basic NE operations, such as NE Login, Alarm/Fault discovery, and NE Data discovery require different amounts of system resources. For example, NE Login is a very lightweight operation, Alarm/Fault discovery is a heavier-weight operation than NE Login, but is still a relatively lightweight operation, and NE Data discovery is a heavyweight operation. Likewise, similar operations on different NE Types require different amount of system resources. For example, NE data discovery of a 10 shelf NE is heavier-weight than NE data discovery of a single shelf NE.

The NMS system has a fixed amount of resources—CPU time, communications bandwidth, storage, etc. Therefore, the NMS must efficiently manage the system resources properly.

In addition, different NMS operations have different priorities. The NMS priority policy will define the priorities of the various operations. For example, Alarm/fault discovery has a higher priority than NE data discovery. NE Login in turn has a higher priority than alarm/fault discovery. Typically, user initiated operations may have the highest priority, while automatically scheduled operations may have the lowest priority. In addition, priority of operations may vary by NE. For example, there might be a number of high priority NEs, such as the NE being used by an NMS user. All operations of a high priority NE should have relatively high priority.

The result of prioritization of operations is that the NMS should execute the high priority operations before the low priority operations. However, the weight of the operations should also be taken into consideration. Thus, each NMS operation is assigned a weight and a priority. Operation weight depends on the system resources needed to execute the operation. An NMS priority policy is used to assign a priority to an operation. All the operations are given to a dispatcher routine for execution. The dispatcher monitors the amount of system resources available and using the system resources available, the weight, and the priority of operations pending, controls execution of operations in order to streamline execution of the operations. A data flow diagram of this process is shown in FIG. 7.

Figure 7:
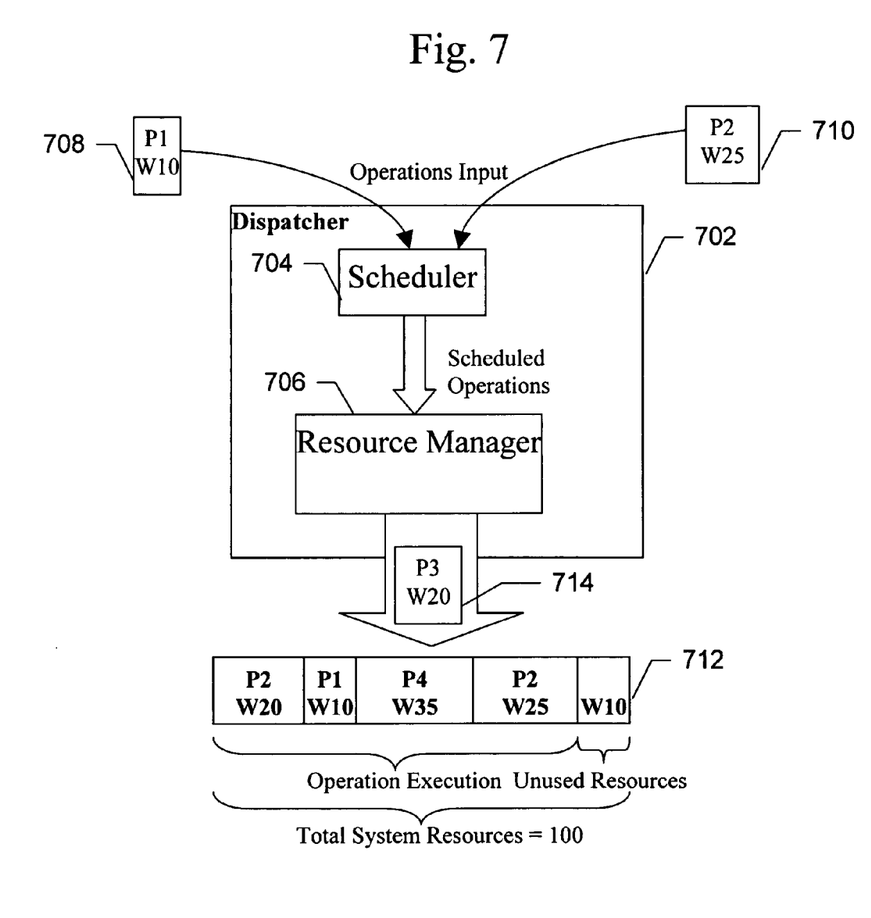
FIG. 7 is an exemplary data flow diagram of a dispatcher process, according to the present invention.

As shown in FIG. 7, dispatcher 702 includes a scheduler 704 and a resource manager 706 and uses operation weight and operation priority to provide resource management and scheduling for the NMS. Scheduler 704 preferably implements priority based scheduling with task aging. This enables operations with higher priority to be completed faster than the operations with lower priority. Resource manager 706 manages system resources at a more granular level thereby ensuring that the system is not over or under utilized.

For example, operation 708, which has a priority of 1 and a weight of 10, and operation 710, which has a priority of 2 and a weight of 25, are input to dispatcher 702 and specifically to an input queue of scheduler 704. Operations having higher priority among those in the input queue of scheduler 704, as modified by the age of the operation in the queue, are output from scheduler 704 to resource manager 706. Resource manager 706 monitors the available resources and initiates execution of operations as resources sufficient to execute the operations become available. In the example shown in FIG. 7, four operations 712 are executing, totaling a weight of 90, which corresponds to 90% usage of NMS resources. Operation 714, with a priority of 3 and a weight of 20, is the next operation scheduled to be executed. However, insufficient resources are available to execute operation 714. With the input of operation 708 to dispatcher 702, an operation has become available that has both a higher priority than the currently scheduled operations and has a weight small enough that sufficient NMS resources are available to execute the operation. Thus, in this example, operation 708 will be scheduled ahead of operation 714 and will begin immediate execution.

In this way, the dispatcher uses the existing NMS resources optimally. The NMS is not under-utilized nor over-utilized. This provides the NMS customers the best possible throughput from the existing resources. As priorities vary from customer to customer and network to network, preferably, NMS customers may define their own priority policies. This way the customers can define which operations are more important to them for their network operations. This provides the customer with more control over the sequence of operation execution and should provide shorter latency for high priority operations.

The operation of the dispatcher as it relates to NE recovery will be described in greater detail below, using, as an example, the NETSMART 1500® by FUJITSU NETWORK COMMUNICATIONS®. This system is used only as an example, and one of skill in the art would recognize that the present invention is equally applicable to any network management system. Thus, the present invention contemplates application to any network management system.

The dispatcher is responsible for scheduling various NETSMART recovery related tasks. The purpose of the dispatcher is two fold:

Scheduling of non preemptive tasks based on task priority,
Ensuring that the total resources needed by the running tasks is less than or equal to the resources available.

Each task that is scheduled by the dispatcher will have a static priority and weight value. The priority value of the task dictates the relative importance of the task. Five levels of priority, 1 to 5 with 1 being the highest priority and 5 being the lowest, are defined. The weight of the task signifies the resources needed by the task (in the application server portion of the NMS) during execution. Total weight available with the dispatcher represents the total resources available with the application server portion of the NMS and is set to 100 units. Each task depending on the resources it needs for execution will have either static or dynamic weight assigned to it. The weight of the task is between 1 and 100, 1 being assigned to tasks that need minimum resources and 100 being assigned to tasks that need all of application server resources for execution.

Figure 8:
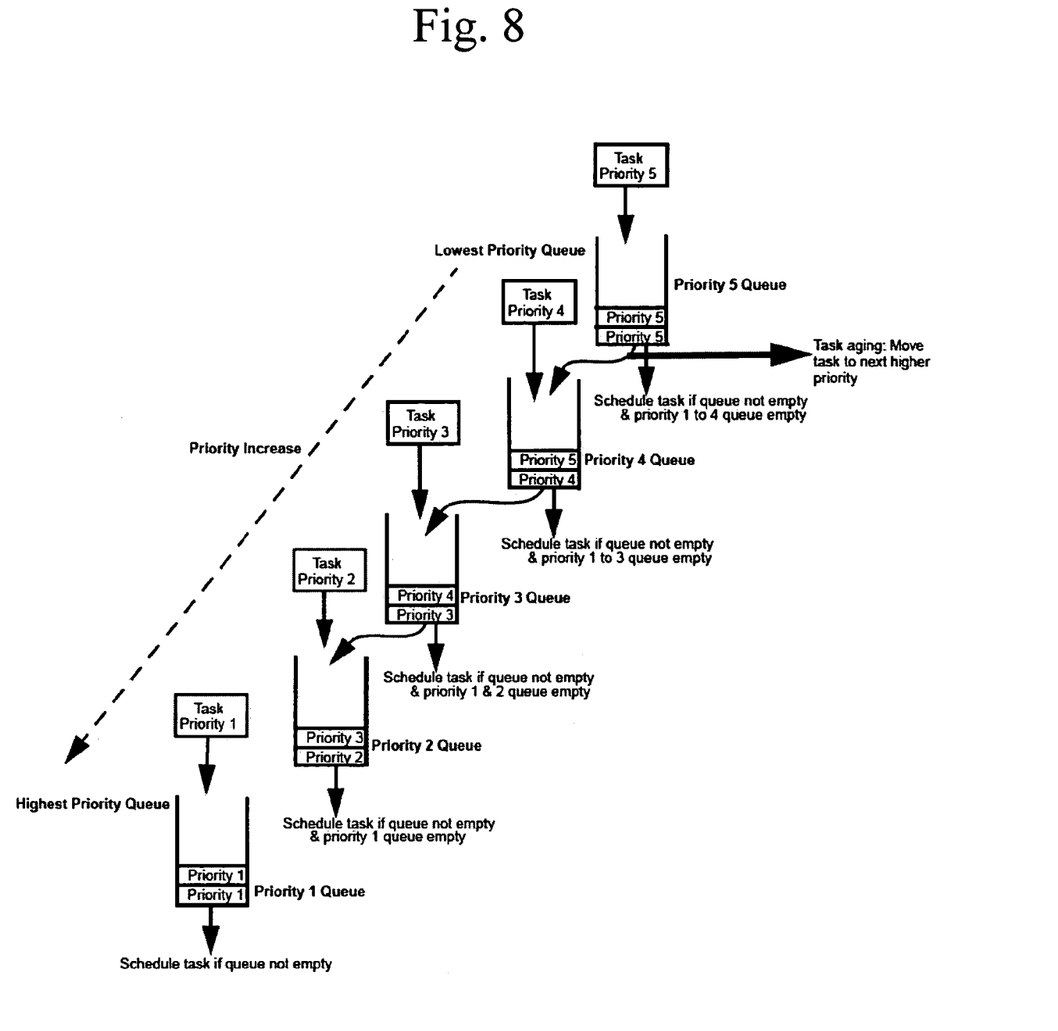
FIG. 8 is an exemplary data flow diagram of Non-Preemptive Priority Based Scheduling with a Task Aging algorithm implemented by the dispatcher process shown in FIG. 7.

The dispatcher will implement non-preemptive priority based scheduling with a task-aging algorithm, as shown in FIG. 8. The dispatcher algorithm uses task aging to ensure that there is no starvation of low priority tasks when high priority tasks are continuously added to the dispatcher. The following are the details of the algorithm:

Components in the application server portion of the NMS will use an interface provided by the dispatcher to schedule various tasks. The dispatcher will determine the priority and the weight of the task based on the task type. Internally the dispatcher maintains 5 queues. Queue 1 has the highest priority and queue 5 has the lowest priority. The dispatcher will queue the task at the end of the priority queue that corresponds to the priority of the task. For e.g., task with priority 3 will be queued at the end of priority 3 queue.

The dispatcher will maintain a variable called totalWeightAvailable. As the name suggests this variable will monitor the resources available in the application server portion of the NMS that can be used for scheduling pending tasks. When there is no task being executed by the application server totalWeightAvailable is 100.

If the priority 1 queue is not empty, the dispatcher will find the weight of the first task (oldest task) in the queue. If the weight of the task is less than or equal to totalWeightAvailable then the dispatcher will schedule the task. The dispatcher will reduce totalWeightAvailable by the weight of the task scheduled.

The dispatcher will schedule the next task from the priority 1 queue if the queue is not empty and totalWeightAvailable is greater than or equal to the weight of the next task. If the priority 1 queue is empty, the dispatcher will check if there is any task pending in the priority 2 queue. If the priority 2 queue is not empty, its oldest task will be scheduled after checking the available resources. The algorithm similarly schedules the tasks in the priority 3 to 5 queues.

When a task gets completed, the dispatcher adds the weight of the completed task back to totalWeightAvailable variable. Each time three tasks complete execution the dispatcher executes the task aging algorithm in which the oldest task in each of the priority 3 to 5 queue age, i.e. the first (oldest) task in the priority queue is removed and put as the last (youngest) task in the next higher queue. For e.g., the oldest task from the priority 5 queue (task at the head of the queue) will be removed from the priority 5 queue and put at the end of the priority 4 queue as the youngest task. Note that there is no aging of tasks from the priority queue 2 to the priority queue 1. After executing the aging algorithm the dispatcher will pick the task to schedule according the algorithm described above.

Table A shows examples of the static priority of various tasks for NE recovery.

TABLE A

Priority of Recovery Tasks

| Scenario | Operation | Priority |
| --- | --- | --- |
| Recovery | Recovery Login | 2 |
| | Alarm Recovery | 2 |
| | Smart Resync (Recovery) | 3 |
| | Config Recovery | 4 |
| Comm Loss Recovery | Alarm Comm Loss Recovery | 2 |
| | Smart Resync Comm Loss | 3 |
| | Config Comm Loss Recovery | 4 |

Figure 9:
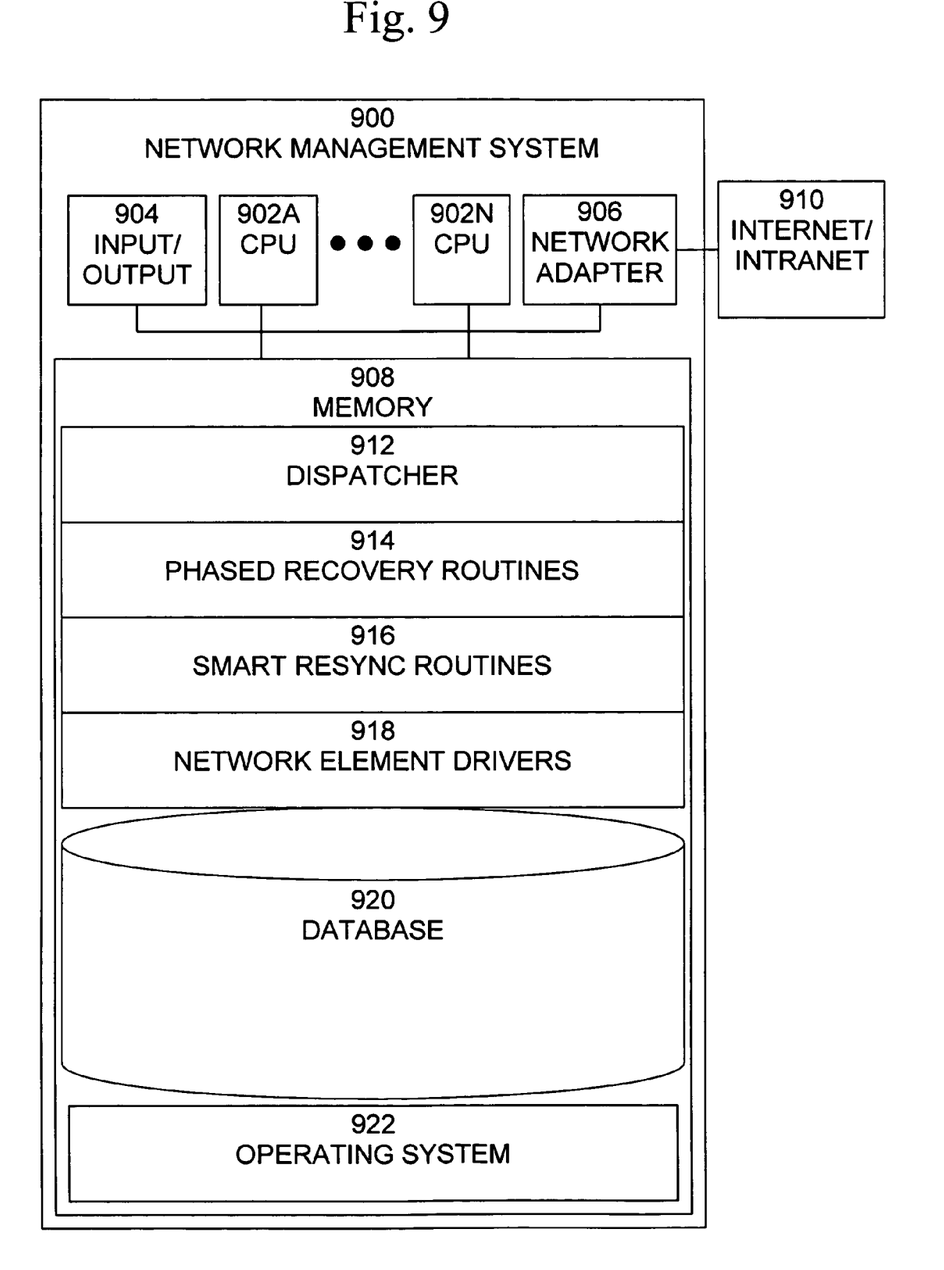
FIG. 9 is an exemplary block diagram of a network management system 900, in which the present invention may be implemented.

An exemplary block diagram of a network management system 900, in which the present invention may be implemented, is shown in FIG. 9. Network management system 900 is typically a programmed general-purpose computer system, such as a personal computer, workstation, server system, and minicomputer or mainframe computer, but may also be a programmed special-purpose computer, custom circuitry, or the like. Network management system 900 includes one or more processors (CPUs) 902A-902N, input/output circuitry 904, network adapter 906, and memory 908. CPUs 902A-902N execute program instructions in order to carry out the functions of the present invention. Typically, CPUs 902A-902N are one or more microprocessors, such as an INTEL PENTIUM® processor. FIG. 9 illustrates an embodiment in which network management system 900 is implemented as a single multi-processor computer system, in which multiple processors 902A-902N share system resources, such as memory 908, input/output circuitry 904, and network adapter 906. However, the present invention also contemplates embodiments in which network management system 900 is implemented as a plurality of networked computer systems, which may be single-processor computer systems, multi-processor computer systems, or a mix thereof.

Input/output circuitry 904 provides the capability to input data to, or output data from, network management system 900. For example, input/output circuitry may include input devices, such as keyboards, mice, touchpads, trackballs, scanners, etc., output devices, such as video adapters, monitors, printers, etc., and input/output devices, such as, modems, etc. Network adapter 906 interfaces network management system 900 with Internet/intranet 910. Internet/intranet 910 may include one or more standard local area network (LAN) or wide area network (WAN), such as Ethernet, Token Ring, the Internet, or a private or proprietary LAN/WAN.

Memory 908 stores program instructions that are executed by, and data that are used and processed by, CPU 902 to perform the functions of network management system 900. Memory 908 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 9, memory 908 includes dispatcher 912, phased recovery routines 914, smart resync routines 916, network element drivers 918, and database 920. Dispatcher 912 monitors the amount of system resources available and using the system resources available, the weight, and the priority of operations pending, controls execution of operations in order to streamline execution of the operations. Phased recovery routines 914 implement the phased recovery process for network recovery of multiple NEs, such as at NMS restart, or at re-establishment of communication after loss of communication with the NMS. Smart resync routines 916 implement the smart resync process, which determines if NE configuration has changed and if full NE resync is needed. A full NE data recovery is performed only if the smart resync process determines that the NE configuration has changed and that a full NE data recovery is necessary. Operating system 922 provides overall system functionality.

As shown in FIG. 9, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of recovering data from a network element at a network management system comprising the steps of:

determining whether a data buffer of the network element is valid;

if the data buffer of the network element is valid, determining whether the data buffer of the network element contains a database change event not received by the network management system;

if the data buffer of the network element is not valid or if the data buffer of the network element contains a database change event not received by the network management system, indicating that the data buffer of the network element is out-of-sync with the network management system; and if the data buffer of the network element is valid and if the data buffer of the network element does not contains a database change event not received by the network management system, indicating that the data buffer of the network element is in sync with the network management system.

2. The method of claim 1, wherein the step of determining whether a data buffer of the network element is valid comprises the steps of:

determining whether a last event of the network element received by the network management system from the network element is present in the data buffer of the network element; and if the last event received by the network management system from the network element is present in the data buffer of the network element, determining that the data buffer of the network element is valid.

3. At a network management system, a method of recovering operations of a network comprising a plurality of network elements, the method comprising the steps of:

logging in to each of the plurality of network elements;

after logging in to each of the plurality of network elements, recovering active faults from each of the plurality of network elements; and after recovering active faults from each of the plurality of network elements, recovering data from each of the plurality of network elements, wherein for each network element it is determined whether a data buffer of the network element is valid;

and whether the data buffer of the network element contains a database change event not received by the network management system.

4. The method of claim 3, further comprising the step of:
after logging in to a network element, but before logging in to all of the plurality of network elements, performing on the network element operations that only require connectivity to the network element.

5. The method of claim 4, further comprising the step of:
after recovering active faults from the network element, but before recovering active faults from all of the plurality of network elements, monitoring the network element for additional faults and alarms.

6. The method of claim 5, further comprising the step of:
after recovering data from the network element, but before recovering data from all of the plurality of network elements, resuming network operations with the network element.

7. The method of claim 3, wherein the step of recovering data from each of the plurality of network elements further comprises, for each network element, the steps of:

when the data buffer of the network element is valid, it is determined whether the data buffer of the network element contains a database change event not received by the network management system;

when the data buffer of the network element is not valid or when the data buffer of the network element contains a database change event not received by the network management system, it is indicated that the data buffer of the network element is out-of-sync with the network management system; and when the data buffer of the network element is valid and when the data buffer of the network element does not contains a database change event not received by the network management system, it is indicated that the data buffer of the network element is in sync with the network management system.

8. The method of claim 7, wherein the step of determining whether a data buffer of the network element is valid comprises the steps of:

determining whether a last event of the network element received by the network management system from the network element is present in the data buffer of the network element; and if the last event received by the network management system from the network element is present in the data buffer of the network element, determining that the data buffer of the network element is valid.

9. The method of claim 8, further comprising the step of:
after logging in to the network element, but before logging in to all of the plurality of network elements, performing on the network element operations that only require connectivity to the network element.

10. The method of claim 9, further comprising the step of:
after recovering active faults from the network element, but before recovering active faults from all of the plurality of network elements, monitoring the network element for additional faults and alarms.

11. The method of claim 10, further comprising the step of:
after recovering data from the network element, but before recovering data from all of the plurality of network elements, resuming network operations with the network element.

12. A method of controlling operations of a network management system on a network comprising a plurality of network elements, the method comprising the steps of:

assigning a weight and a priority to each of a plurality of operations to be performed on the network management system;

executing at least one of the plurality of operations based on the weight and priority of the at least one operation, based on the weights and priorities of other operations to be performed, and based on utilization of resources of the network management system by operations that are being executed, wherein the plurality of operations to be executed by the network elements include recovering active faults from each of the plurality of network elements and recovering data from each of the plurality of network elements, and wherein for each network element it is determined whether a data buffer of the network element is valid;

and whether the data buffer of the network element contains a database change event not received by the network management system.

13. The method of claim 12, wherein the executing step comprises the step of:
executing the at least one of the plurality of operations using priority based scheduling with task weighting.

14. The method of claim 12, wherein the executing step comprises the steps of:

scheduling for execution an oldest operation as a highest priority operation for execution from among the plurality of operations to be executed; and executing the scheduled operation, if sufficient resources of the network management system are available to execute the scheduled operation.

15. The method of claim 14, further comprising the step of:
determining whether sufficient resources of the network management system are available to execute the scheduled operation based on a weight of the scheduled operations and on weights of the operations that are being executed.

16. The method of claim 15, wherein the plurality of operations to be executed by the network management system further comprises:

logging in to each of the plurality of network elements;

after logging in to each of the plurality of network elements, recovering the active faults from each of the plurality of network elements; and after recovering the active faults from each of the plurality of network elements, recovering the data from each of the plurality of network elements.

17. The method of claim 16, further comprising the step of:
after logging in to a network element, but before logging in to all of the plurality of network elements, performing on the network element operations that only require connectivity to the network element.

18. The method of claim 17, further comprising the step of:
after recovering active faults from the network element, but before recovering active faults from all of the plurality of network elements, monitoring the network element for additional faults and alarms.

19. The method of claim 18, further comprising the step of:
after recovering data from the network element, but before recovering data from all of the plurality of network elements, resuming network operations with the network element.

20. The method of claim 16, wherein the step of recovering data from each of the plurality of network elements comprises, for each network element, the steps of:
when the data buffer of the network element is valid, it is determined whether the data buffer of the network element contains a database change event not received by the network management system;
when the data buffer of the network element is not valid or when the data buffer of the network element contains a database change event not received by the network management system, it is indicated that the data buffer of the network element is out-of-sync with the network management system; and
when the data buffer of the network element is valid and when the data buffer of the network element does not contains a database change event not received by the network management system, it is indicated that the data buffer of the network element is in sync with the network management system.

21. The method of claim 20, wherein the step of determining whether a data buffer of the network element is valid comprises the steps of:
determining whether a last event of the network element received by the network management system from the network element is present in the data buffer of the network element; and
if the last event received by the network management system from the network element is present in the data buffer of the network element, determining that the data buffer of the network element is valid.

22. The method of claim 21, further comprising the step of:
after logging in to the network element, but before logging in to all of the plurality of network elements, performing on the network element operations that only require connectivity to the network element.

23. The method of claim 22, further comprising the step of:
after recovering active faults from the network element, but before recovering active faults from all of the plurality of network elements, monitoring the network element for additional faults and alarms.

24. The method of claim 23, further comprising the step of:
after recovering data from the network element, but before recovering data from all of the plurality of network elements, resuming network operations with the network element.

25. A network management system operable to recovering data from a network element comprising:
circuitry operable to determine whether a data buffer of the network element is valid;
circuitry operable to determine whether the data buffer of the network element contains a database change event not received by the network management system, if the data buffer of the network element is valid;
circuitry operable to indicate that the data buffer of the network element is out-of-sync with the network management system, if the data buffer of the network element is not valid or if the data buffer of the network element contains a database change event not received by the network management system; and
circuitry operable to indicate that the data buffer of the network element is in sync with the network management system, if the data buffer of the network element is valid and if the data buffer of the network element does not contains a database change event not received by the network management system.

26. The system of claim 25, wherein the circuitry operable to determine whether a data buffer of the network element is valid comprises:
circuitry operable to determine whether a last event of the network element received by the network management system from the network element is present in the data buffer of the network element; and
circuitry operable to determine that the data buffer of the network element is valid, if the last event received by the network management system from the network element is present in the data buffer of the network element.

27. A network management system operable to recover operations of a network comprising a plurality of network elements, the system comprising:
circuitry operable to log in to each of the plurality of network elements;
circuitry operable to recover active faults from each of the plurality of network elements, after logging in to each of the plurality of network elements; and
circuitry operable to recover data from each of the plurality of network elements, after recovering active faults from each of the plurality of network elements, wherein for each network element it is determined whether a data buffer of the network element is valid; and whether the data buffer of the network element contains a database change event not received by the network management system.

28. The system of claim 27, further comprising:
circuitry operable to perform on a network element operations that only require connectivity to the network element, after logging in to the network element, but before logging in to all of the plurality of network elements.

29. The system of claim 28, further comprising:
circuitry operable to monitor the network element for additional faults and alarms after recovering active faults from the network element, but before recovering active faults from all of the plurality of network elements.

30. The system of claim 29, further comprising:
circuitry operable to resume network operations with the network element, after recovering data from the network element, but before recovering data from all of the plurality of network elements.

31. The system of claim 30, wherein the circuitry operable to recover data from each of the plurality of network elements is further operable to, for each network element:
when the data buffer of the network element is valid, it is determined whether the data buffer of the network element contains a database change event not received by the network management system;
when the data buffer of the network element is not valid or when the data buffer of the network element contains a database change event not received by the network management system, it is indicated that the data buffer of the network element is out-of-sync with the network management system; and
when the data buffer of the network element is valid and when the data buffer of the network element does not contains a database change event not received by the network management system, it is indicated that the data buffer of the network element is in sync with the network management system.

32. The system of claim 31, wherein circuitry operable to recover data from each of the plurality of network elements is operable to determine whether a data buffer of the network element is valid by:
  determining whether a last event of the network element received by the network management system from the network element is present in the data buffer of the network element; and
  if the last event received by the network management system from the network element is present in the data buffer of the network element, determining that the data buffer of the network element is valid.

33. The system of claim 32, wherein the circuitry operable to recover data from each of the plurality of network elements is further operable to:
  after logging in to the network element, but before logging in to ail of the plurality of network elements, perform on the network element operations that only require connectivity to the network element.

34. The system of claim 33, wherein the circuitry operable to recover data from each of the plurality of network elements is further operable to:
  after recovering active faults from the network element, but before recovering active faults from all of the plurality of network elements, monitor the network element for additional faults and alarms.

35. The system of claim 34, wherein the circuitry operable to recover data from each of the plurality of network elements is further operable to:
  after recovering data from the network element, but before recovering data from all of the plurality of network elements, resume network operations with the network element.

36. A network management system on a network comprising a plurality of network elements, the system comprising:
  circuitry operable to control operations of the network management system by:
  assigning a weight and a priority to each of a plurality of operations to be performed on the network management system;
  executing at least one of the plurality of operations based on the weight and priority of the at least one operation, based on the weights and priorities of other operations to be performed, and based on utilization of resources of the network management system by operations that are being executed wherein the plurality of operations to be executed by the network elements include recovering active faults from each of the plurality of network elements and recovering data from each of the plurality of network elements, and wherein for each network element it is determined whether a data buffer of the network element is valid; and whether the data buffer of the network element contains a database change event not received by the network management system.

37. The system of claim 36, wherein the circuitry is operable to execute at least one of the plurality of operations by:
  executing the at least one of the plurality of operations using priority based scheduling with task weighting.

38. The system of claim 36, wherein the circuitry is operable to execute at least one of the plurality of operations by:
  scheduling for execution an oldest operation as a highest priority operation for execution from among the plurality of operations to be executed; and
  executing the scheduled operation, if sufficient resources of the network management system are available to execute the scheduled operation.

39. The system of claim 38, wherein the circuitry is further operable to execute at least one of the plurality of operations by:
  determining whether sufficient resources of the network management system are available to execute the scheduled operation based on a weight of the scheduled operations and on weights of the operations that are being executed.

40. The system of claim 39, wherein the plurality of operations to be executed by the network management system further comprises:
  logging in to each of the plurality of network elements;
  after logging in to each of the plurality of network elements, recovering the active faults from each of the plurality of network elements; and
  after recovering the active faults from each of the plurality of network elements, recovering the data from each of the plurality of network elements.

41. The system of claim 40, wherein the circuitry is further operable to execute at least one of the plurality of operations by:
  after logging in to a network element, but before logging in to all of the plurality of network elements, performing on the network element operations that only require connectivity to the network element.

42. The system of claim 41, wherein the circuitry is further operable to execute at least one of the plurality of operations by:
  after recovering active faults from the network element, but before recovering active faults from all of the plurality of network elements, monitoring the network element for additional faults and alarms.

43. The system of claim 42, wherein the circuitry is further operable to execute at least one of the plurality of operations by:
  after recovering data from the network element, but before recovering data from all of the plurality of network elements, resuming network operations with the network element.

44. The system of claim 40, wherein the circuitry is further operable to recover data from each of the plurality of network elements by, for each network element:
  when the data buffer of the network element is valid, it is determined whether the data buffer of the network element contains a database change event not received by the network management system;
  when the data buffer of the network element is not valid or when the data buffer of the network element contains a database change event not received by the network management system, it is indicated that the data buffer of the network element is out-of-sync with the network management system; and
  when the data buffer of the network element is valid and when the data buffer of the network element does not contains a database change event not received by the network management system, it is indicated that the data buffer of the network element is in sync with the network management system.

45. The system of claim 44, wherein the circuitry is further operable to determine whether a data buffer of the network element is valid by:
  determining whether a last event of the network element received by the network management system from the network element is present in the data buffer of the network element; and
  if the last event received by the network management system from the network element is present in the data buffer of the network element, determining that the data buffer of the network element is valid.

46. The system of claim 45, wherein the circuitry is further operable to execute at least one of the plurality of operations by:

after logging in to the network element, but before logging in to all of the plurality of network elements, performing on the network element operations that only require connectivity to the network element.

47. The system of claim 46, wherein the circuitry is further operable to execute at least one of the plurality of operations by:

after recovering active faults from the network element, but before recovering active faults from all of the plurality of network elements, monitoring the network element for additional faults and alarms.

48. The system of claim 47, wherein the circuitry is further operable to execute at least one of the plurality of operations by:

after recovering data from the network element, but before recovering data from all of the plurality of network elements, resuming network operations with the network element.

* * * * *